Patented Oct. 11, 1949

2,484,785

UNITED STATES PATENT OFFICE 2,484,785

1,4-DIHYDRAZINO-PHTHALAZINE AND ITS ACID SALTS

Jean Druey, Riehen, Switzerland, assignor to Ciba Pharmaceutical Products, Inc., Summit, N. J.

No Drawing. Application December 6, 1948, Serial No. 63,861. In Switzerland December 19, 1947

4 Claims. (Cl. 260—250)

The present invention relates to new hydrazine derivatives of compounds containing a pyridazine ring, and has especial relation more particularly to 1:4-dihydrazino-phthalazines. These compounds possess valuable pharmacological properties. Thus, for example, 1:4-dihydrazino-phthalazine brings about a fall in blood pressure of especially long duration. They can be used as medicaments or as intermediate products.

It has been found that the said derivatives can be obtained by converting into hydrazino groups, simultaneously or in succession, two substituents which are convertible into hydrazino groups and which are present in ortho-position to the two ring nitrogen atoms in a compound containing a pyridazine ring. Thus, a compound containing a pyridazine ring and, in ortho-position with respect to each ring nitrogen atom, an exchangeable substituent—for example, an esterified hydroxyl group, especially a halogen atom, or an alkoxy, aryloxy or thioether group, which two substituents may be different from one another—may be reacted with a hydrazine. Dihydrazino-pyridazine compounds are also obtained in accordance with the invention by treating with a reducing agent a compound which contains a pyridazine ring and also contains substituents, for example, nitramino groups which are convertible into hydrazino groups by reduction. By introducing the hydrazino groups in succession it is possible to form hydrazino groups which differ from one another, in which case the two above mentioned forms of the process may be combined.

As compounds which contain a pyridazine ring and which are disubstituted in the ortho-positions with respect to the nitrogen atoms there are used, more especially, those which contain an aromatic nucleus, in particular, phthalazines. Thus, use may be made, for example, of 1:4-dichloro-phthalazine, 1-chloro-4-methoxy-phthalazine, 1-chloro-4-ethoxy-phthalazine, 1-chloro-4-phenoxy-phthalazine, 1:4-dimethylmercapto-phthalazine, 1:4-dinitramino-phthalazine, and also corresponding phthalazines which contain substituents in the aromatic nucleus.

As hydrazines there are used hydrazine itself or substitution products thereof, including those in which one nitrogen atom forms part of a ring, for example, of a piperidine or morpholine ring. Thus, use may be made of the following hydrazines: Hydrazine, methylhydrazine, asymmetrical dimethyl-hydrazine, symmetrical dimethyl-hydrazine, propyl-hydrazine, allyl-hydrazine, N-methyl-N-butyl-hydrazine, N-amino-piperidine, N-amino-morpholine, 3-methyl-cyclohexyl-hydrazine and the like. These hydrazines may also be used in the form of their salts. The reaction with the hydrazine is advantageously conducted in the presence of a diluent, and, if desired, also in the presence of a condensing agent, in which case it may also be carried out in the presence of a catalyst such as copper powder.

The reduction, for example, of the nitramine-compounds, in accordance with the invention to form the hydrazines, may be brought about, for example, catalytically or by means of zinc dust in the presence of caustic soda solution. The hydrazines so obtained easily form salts with inorganic or organic acids, as for example with hydrohalic acids, such as hydrochloric acid, sulfuric acid, phosphoric acid, thiocyanic acid, methanesulfonic acid, hydroxy ethanesulfonic acid, acetic acid or tartaric acid.

The following examples illustrate the invention, the parts being by weight unless otherwise stated, and the relationship of parts by weight to parts by volume being the same as that of the gram to the cubic centimeter:

*Example 1*

6.6 parts of 1-chloro-4-methoxy-phthalazine (melting at 108–109° C., and obtained from 1:4-dichloro-phthalazine and sodium methylate) are introduced into a warm mixture of 25 parts by volume of hydrazine hydrate and 25 parts by volume of absolute ethyl alcohol. Dissolution occurs immediately. After being heated for 2 hours on the water-bath, the whole is cooled and crystallization sets in. By filtering with suction and washing with ethyl alcohol there are obtained about 5 parts of 1:4-dihydrazino-phthalazine, an orange colored compound of the formula

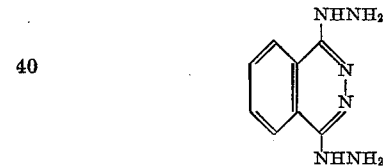

which crystallizes from water in fine small needles and melts at about 180° C. The corresponding dihydrochloride is obtained with 2N-hydrochloric acid. It crystallizes with a small amount of water of crystallization and melts unsharply with decomposition at about 255° C. In an analogous manner, there can be obtained other salts, for example of sulfuric acid, phosphoric acid, thiocyanic acid, methanesulfonic acid, hydroxy ethanesulfonic acid, acetic acid or tartaric acid.

Instead of 1-chloro-4-methoxy-phthalazine, the corresponding 4-ethoxy-compound may be used as starting material. The latter is obtained from 1:4-dichloro-phthalazine in ethyl alcohol in the presence of sodium ethylate, and melts at 78° C.

When 1:4-diphenoxy-phthalazine (melting at 222° C., and obtained from 1:4-dichloro-phthalazine and sodium phenolate) is used as starting material, the reaction with hydrazine hydrate is advantageously conducted at a raised temperature in a bomb tube.

*Example 2*

By the action of hydrazine hydrate on 1:4-dichloro-phthalazine under mild conditions there is obtained 1-hydrazino-4-chloro-phthalazine (of which the hydrochloride melts at about 150° C.), which when heated to about 150° C. undergoes further conversion into 1:4-dihydrazino-phthalazine melting at 180° C.

Having now disclosed the invention, what is claimed is:

1. A compound selected from the group consisting of 1:4-dihydrazino-phthalazine and its acid salts.
2. 1:4-dihydrazino-phthalazine.
3. An acid salt of 1:4-dihydrazino-phthalazine.
4. The dihydrochloride of 1:4-dihydrazino-phthalazine.

JEAN DRUEY.

No references cited.